Nov. 26, 1968 F. K. SENDER 3,413,627

MAGNETIC HEAD MOUNTING

Filed Oct. 6, 1965

Friedhelm K. Sender
INVENTOR.

BY
Arnold and Roylance
ATTORNEYS

United States Patent Office 3,413,627

Patented Nov. 26, 1968

3,413,627
MAGNETIC HEAD MOUNTING

Friedhelm K. Sender, Hannover, Germany, assignor to Prakla Gesellschaft fur Praktische Lagerstattenforschung GmbH, Hannover, Germany, a corporation of Germany

Filed Oct. 6, 1965, Ser. No. 493,424
5 Claims. (Cl. 340—174.1)

This invention relates to a mounting for magnetic heads for the purpose of providing an improved cooperation of elements with magnetic drums or with magnetic tapes positioned on cylindrical drum surfaces. This mounting is suitable, especially for use in geophysical recorders. in which several recording traces are positioned side by side or in parallel.

In seismic exploration following a transmitted sound pulse, sound signals returning out of the earth are received by several geophones positioned on the surface of the earth. Each of these geophones converts its received sound pulses to an electrical seismic signal for further processing and recording. In order to make the electrical pulses more meaningful for examination, it is not at all uncommon for components of the signals to be removed, for instance those components which would otherwise record with greater modulation, leaving signal components of minor modulation which contain finer nuances of meaning.

Of course, it should be recognized that by filtering the larger modulation products and recording the minor modulation products a proportionally higher noise level does result. Because of the naturally resulting higher noise level, in recording the resultant signals it is important to minimize any internally generated noise that might cause additional interference.

Typical of the seismic recording equipment currently in widespread use are multitrace recording devices having magnetic tapes mounted on drums. In using such equipment, the electronic seismic traces described above are separately recorded, one beside the other on the same tape such that the overall presentation is in parallel across the surface of the drum. With such a presentation, the minute observance of compliance of time between the recorded traces is possible for further treatment, as for example, for stacking, filtering, statistical and dynamical corrections and interpretations.

The plain bearings or other sliding components normally found in conventional magnetic head fasteners move or chatter with respect to each other in an undesired manner in the direction of motion of the record support. The gaps that exist as the parts separate slightly from one another during normal operation are known as interspaces. If the parts of the magnetic head fasteners having plain bearings in the magnetic head holders are arranged so tightly that the interspaces are made small, they jam immediately in the presence of only a small amount of dirt particles. Therefore, as a practical matter, it is impossible to eliminate the existence of interspace when plain bearings are employed.

These undesired motions of the parts of the fasteners, which may conveniently be referred to as self motions, generate spurious oscillations or noise, a part of the frequency spectrum of which lies partially within the frequency spectrum of seismic signals. In frequency-modulated methods of pulse recording, these undesired self-motion noise products of the magnetic head appear extremely strong.

Furthermore, most of the holders guide the heads to the magnetic recording medium on curved paths, rather than along paths vertical to the direction of motion of the magnetic recording medium, so that there are differences in time reproduction of the recorded signals between the individual traces determined by the relative altitude level of the different magnetic heads. In addition, with such holders after only a relatively short working time an adjusted head bank notoriously drifts out of time synchronism because of the different wear of split parts of the magnetic heads. This drift occurs because the individual heads sink differently on their respective curved paths.

It has already been proposed to move the magnetic head fastener on two bars, arranged vertically to the direction of motion of the recording medium, by means of sliding sleeves. In such an arrangement, vertical movement is possible only after overcoming the static friction of the bearing surfaces between the bars and the sleeves corresponding to the sliding frictional force between the recording medium and the magnetic head that rides thereon. Again, unless there are interspaces present around the bars, the frictional components of the highly polymerical artificial substances that are commonly used are so great that effective blocking of the magnetic head occurs. When the interspaces are made large enough to prevent blocking from occurring, oscillations of the magnetic head fastener result, these oscillations producing interfering signals in the frequency range of interest.

The purpose of this invention is to produce a mounting for magnetic heads movable substantially vertically to the direction of motion of a magnetic recording medium, suitable for a close, parallel layout, free of all the disadvantages mentioned above with respect to the prior art structures. and composed of simple components. This advantageous movement may be realized by supporting the magnetic head by two straight ball bearings, one of which is located on each side of the magnetic head and magnetic head fastener, to permit in and out or vertical movement thereof within the main instrument frame carrying the heads and fasteners.

One of these ball bearings may comprise at least two balls spaced apart from each other and aligned in a plane substantially vertical to the direction of motion of the recording medium. The other ball bearing may comprise only one ball which may be hingedly held along an inclined plane between the magnetic head and main frame via a spring connector. Preferably, this other ball bearing is resiliently positioned between a track on the fastener of the magnetic head inclined to the vertical and a similarly inclined countertrack on the main instrument frame. The incline is such that when the ball travelling in the track is at the point therein nearest the recording medium, it will be horizontally at its furthest location from the vertically positioned balls.

A piece or block of the main frame in which the inclined countertrack is formed may be pivotally positioned about a point on either side of the possible travel limits of the ball to provide a moment of force to be applied by leverage action to the countertrack via the spring. Thus, the pressure against the ball rolling on the slope is pressed into its track in the magnetic head fastener and the two vertically spaced balls on the other side thereof are similarly pressed into their track. Hence, all possibility of there being an interspace is eliminated.

It should be further noted that at the same time the spring effects the generation of a pressure component to urge the magnetic head toward the recording medium due to the vectorial resolution of forces at the sloping countertrack A spring either in compression or in tension may be used for applying the pressure, the choice merely depending on the desired mounting configuration.

The balls are suitably limited in their position possibility by pins set into the magnetic head and magnetic head fastener so that the balls are situated in their predominant range of effectiveness. The ball operating on the inclined or sloping track is arranged for an optimal compensation of the tilting moment by being located horizontally above the middle of the two balls that track vertically. The effecting and resulting force on the ball ensures vertical movement of the magnetic head.

In a close parallel layout of several mountings of the kind described herein, a joint magnetic head block may be produced in a simple way. In such a block all magnetic head gaps are positioned in line so that the guide plate supporting the vertical ball tracks may be executed jointly for all heads. Thus it may be seen that these ball tracks can be milled as V-shaped grooves in a plate with only a single adjustment of a milling machine.

Simplified embodiments of the invention are shown in the enclosed drawings, which form a part of this specification, and are explained hereafter. In the drawings.

Figure 1:
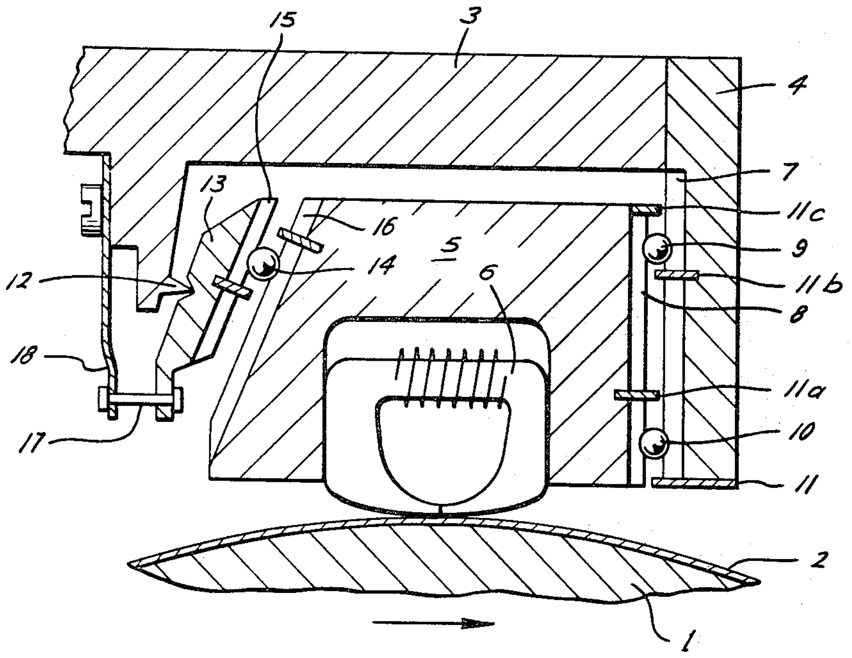
FIG. 1 is a magnetic head fastener of one embodiment of the invention shown partly in longitudinal section and in the working position.

On drum 1 a magnetic tape 2 is chucked, being mounted in the usual way. The direction of rotation is clockwise and indicated by a drawn-in arrow. On the instrument frame a base plate 3 is fixed, on the front part of which a guide plate 4 is fixed in a plane vertical or normal to the surface element of drum 1. This surface element passes beneath the split of a magnetic head 6 in a manner described below.

Magnetic head 6 is connected to a magnetic head fastener 5, by splicing for example. For each magnetic head arranged in parallel, a V-shaped groove 7 is made at guide plate 4 to serve as a vertical guide track for two balls 9 and 10, this track being located in the direction of motion of the drum behind magnetic head 6. An adequate countertrack V-shaped groove 8 is milled into the magnetic head fastener 5. Pins or stop sheets 11, **11*a*, 11*b*, and 11*c* respectively limit the free movement of balls 9 and 10, so that an escape of the balls from the magnetic head fastener 5** is impossible.

On the other side of the magnetic head fastener 5, another V-shaped groove 16 is made that is inclined slightly with respect to the vertical in the direction of the motion of the drum. Only one ball 14 is located to run in this groove. A countertrack 15 on block 13 complementary to groove 16 is made traversable around an edge 12, a projection depending from the rear of frame 3. A plate spring 18 secured to base plate 3 is connected to the lower end of block 13 via tie rod 17. The contact point of block 13 with edge 12, which may be a mating groove for edge 12 to ensure the precision of position and action of edge 12, is such that spring 18 attempts to rotate block 13 and hence counter-track 15, in a clockwise direction. Thus the ball 14, lying above edge 12, is pressed into V-shaped grooves 15 and 16 without interspace, transferring a horizontal pressure component to opposite lying balls 9 and 10 in such a way that even these balls touch their grooves 7 and 8 without an interspace. Because of the sloping layout of grooves 15 and 16 a smaller pressure component is generated to set the effecting pressure of magnetic head 6 on magnetic tape 2 on drum 1.

As is readily apparent, a mounting for magnetic heads is produced according to the above-described method that neither has a lateral nor a longitudinal interspace, and yet remains easily and equally movable such that the direction of motion occurs exactly vertical to the magnetic tape surface at the point of contact. Because of the fact that a turning moment is generated by the frictional force starting at the split in magnetic head 6, the single ball 14 is arranged suitably somewhat below the upper ball 9 on the opposite side, resulting in an essentially vertical position of head 6 on tracks 15 and 16 by the pressure of spring 18 and the turning moment of the friction. In case of variations or fluctuations in the radius dimension of the drum, an even recording and playback of the magnetic head mounted in the above manner may be obtained during a survey.

Figure 2:
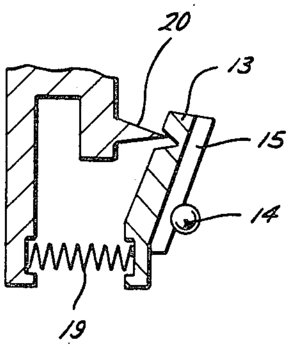
FIG. 2 is a fragment of an alternate embodiment of the execution of the spring load of the countertrack of the magnetic head fastener shown in FIG. 1.

FIG. 2 shows an alternate positioning of ball 14 with respect to pivot edge 20, comparable to edge 12 in FIG. 1. In FIG. 2 ball 14 is located below edge 20 so that compression spring 19 connected to block 13 is used to effect the clockwise rotation of countertrack 15. Notice that edge 20 may ride up slightly on the edge of the receiving groove of block 13 if need be, thereby permitting the mode of operation to be in accordance with the description of the embodiment shown in FIG. 1.

For multitrace recordings with many magnetic traces and magnetic heads arranged in parallel—as for example 28 heads in a seismic recording equipment—guide plate 4 may be extended advantageously across all magnetic heads arranged in parallel and may have its many grooves 7 milled in parallel, which can be produced with exactness and equality in the same operation. If, in this case, magnetic heads 6 are spliced to fastener 5 by means of a model mechanism with relatively conforming split positioning, an exact, mutual direction of the splits results during the assembly of the complete magnetic head bank that will not change during the lifetime of the device, especially not because of wear.

While various embodiments of the invention have been described, it is obvious that various substitutes or modification of structure may be made without varying from the scope of the invention.

What is claimed is:

1. A magnetic head positioning device for guiding a magnetic head in a direction normal to the surface of a movable magnetic recording medium, comprising
   - an instrument frame suitably positioned opposite the recording medium and having a guide track along an inside surface thereof that is substantially normal to a plane tangent to the recording medium at the point of recording,
   - a magnetic head having a normal guide track along an outside surface thereof and disposed opposite said normal track of said instrument frame,
   - at least two balls spaced apart for traveling between said normal tracks,
   - said magnetic head having an outside track inclined to the normal in the direction of motion of the recording medium on another side of said magnetic head from said normal tracks,
   - said instrument frame carrying a resiliently mounted countertrack similarly inclined and oppositely disposed to said inclined track,
   - a third ball for traveling between said inclined track and countertrack, whereby said magnetic head is urged normally to the surface of the recording medium without interspaces.

2. A magnetic head positioning device in accordance with claim 1, wherein said resiliently mounted countertrack includes
   - a block in which the countertrack is formed pivotally mounted about an edge of said instrument frame, and
   - a spring secured to said instrument frame for inwardly and downwardly pressing said third ball between said inclined track and said countertrack.

3. A magnetic head positioning device in accordance with claim 1, and including stops for limiting the free path length of said balls.

4. A magnetic head positioning device in accordance with claim 1, wherein said third ball is arranged further from said recording medium than the half-way point between said balls travelling in said normal tracks.

5. A magnetic head positioning device for guiding a plurality of magnetic heads in a direction normal to the surface of a movable magnetic recording medium, comprising
   - an instrument frame suitably positioned opposite the recording medium and having a plurality of guide tracks along an inside surface thereof that are substantially normal to a plane tangent to the recording medium at the points of recording, a plurality of independently movable magnetic heads, each head having a normal drive track along an outside surface thereof and disposed opposite a corresponding normal track of said instrument frame, at least two balls for traveling between each of said pairs of normal tracks, each of said magnetic heads having an outside guide track inclined to the normal in the direction of motion of the recording medium on another side of said magnetic head from said normal tracks, said instrument frame carrying a plurality of resiliently mounted countertracks each similarly inclined and oppositely disposed to a respective one of said inclined tracks, a plurality of third balls for traveling between each of said inclined tracks and countertracks, whereby said magnetic heads are independently urged normally to the surface of the recording medium without interspaces.

References Cited

UNITED STATES PATENTS

| | | | |
|---|---|---|---|
| 3,310,791 | 3/1967 | Fischer ----------- | 340—174.1 |
| 2,887,890 | 5/1959 | Schardt ----------- | 340—174.1 |

BERNARD KONICK, *Primary Examiner.*

A. I. NEUSTADT, *Assistant Examiner.*